Patented Mar. 19, 1935

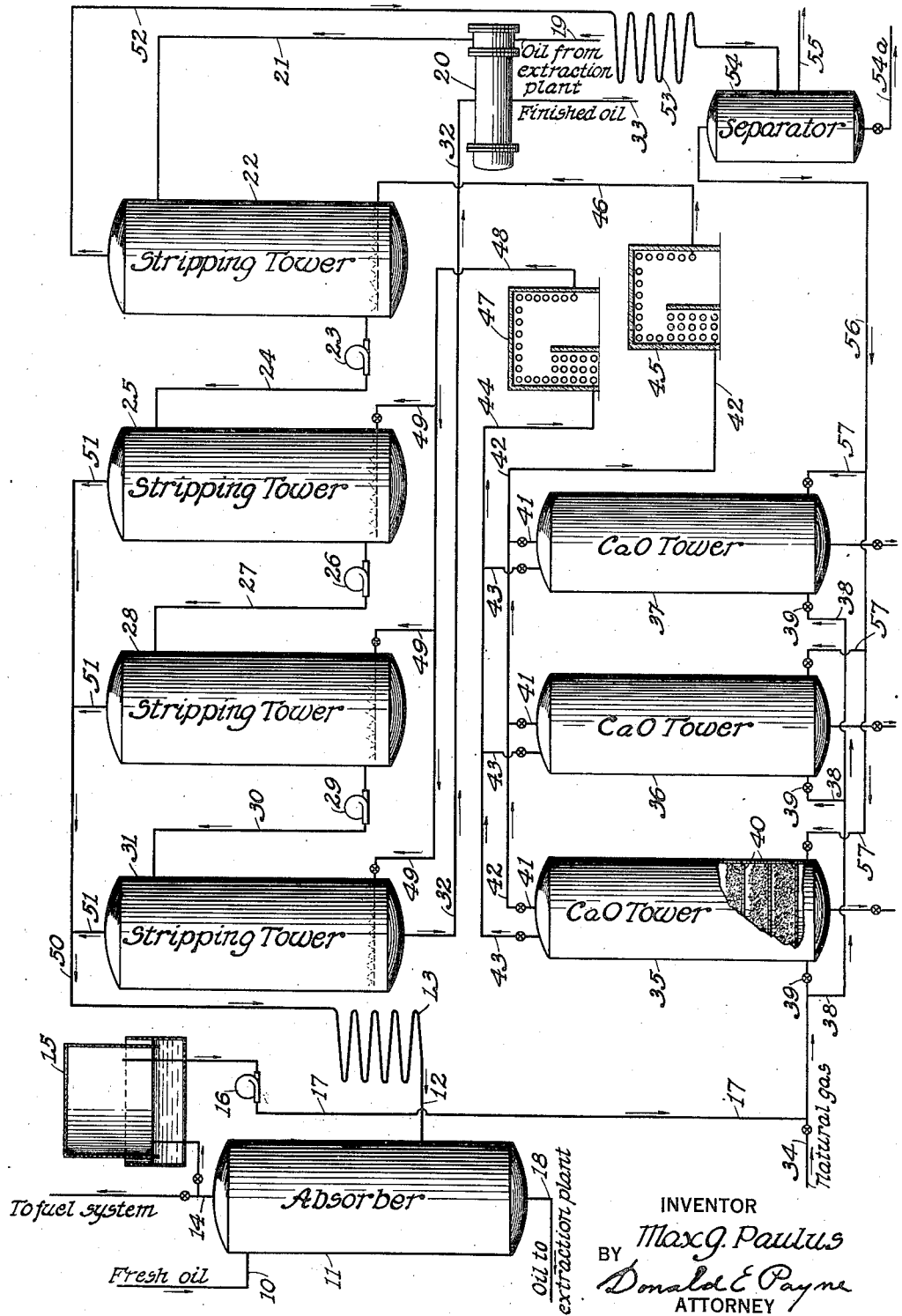

1,994,727

UNITED STATES PATENT OFFICE 1,994,727

SOLVENT RECOVERY IN OIL REFINING

Max G. Paulus, Chicago, Ill., assignor to Standard Oil Company, Chicago, Ill., a corporation of Indiana Application May 10, 1932, Serial No. 610,491

4 Claims. (Cl. 196—88)

This invention relates to the recovery of the last traces of a solvent, such as dichlorethyl ether from an oil which has been treated with said solvent.

Certain processes of refining mineral lubricating oils utilize the selective action of certain organic solvents. For example, paraffinic components of lubricating oils may be effectively separated from naphthenic components by dissolving the latter in a chlorinated solvent such as dichlorethyl ether:

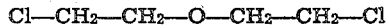

Cl—CH$_2$—CH$_2$—O—CH$_2$—CH$_2$—Cl and separating the paraffinic oil from the dichlorethyl ether solution by contacting, centrifuging or the like. In such a process varying amounts of the solvent are dissolved or entrained in the naphthenic and the paraffinic oil fractions. The object of my invention is to remove the last traces of solvent from the oil without decomposing the solvent and without introducing a corrosion problem.

In practicing the invention I employ a moisture-free, nonoxidizing gas and I use special precautions to keep moisture out of the system. Preferably I use a hydrocarbon gas which may be a byproduct of a petroleum refinery or which may consist of natural gas. I provide special equipment for removing moisture from the gas and I remove all traces of the solvent from the mineral oil by stripping in a specially designed system with this hot, dry hydrocarbon gas.

The accompanying drawing, which forms a part of this specification, is a diagrammatic plan of my improved system.

The invention will be described as applied to the removal of dichlorethyl ether from lubricating oil, but it should be understood that the invention is equally applicable to the removal of traces of other solvents from oils, particularly when those solvents are susceptible to hydrolysis and/or wherein they are likely to yield substances which are corrosive to equipment or undesirable in the oil.

Fresh oil, or in other words, oil which has not yet been treated with the solvent, is introduced by pipe 10 into absorber 11. The absorber may be a cylindrical tower provided with suitable baffles or bubble plates. In this absorber the fresh oil takes up the solvent which is introduced through pipe 12 together with light hydrocarbon gases, the function of which will be hereinafter described.

The hydrocarbon gases leave the top of scrubber 11 through pipe 14, and they may be passed to a fuel system or introduced into an oil sealed storage tank 15 from which they may be transferred by pump 16 and pipe 17 back to the stripping system which will be hereinafter described.

The fresh oil, together with absorbed solvent, is passed by pipe 18 to an extraction plant (not shown) wherein the oil is treated with two or three times its volume of dichlorethyl ether. When the oil has been intimately contacted with the dichlorethyl ether in one or more dumps, the insoluble or paraffinic fraction of the oil which may contain 10–20% of solvent is removed from the dichlorethyl ether solution and introduced through pipe 19, heat exchanger 20 and pipe 21 into stripping tower 22. The oil is forced from the base of this tower by pump 23 through pipe 24 to the upper part of stripping tower 25. In a similar manner oil is forced from the bottom of tower 25 by pump 26 through pipe 27 into stripper 28 and from the base thereof by pump 29 through pipe 30 into stripper 31. The oil from the base of stripper 31 is conducted by pipe 32 to heat exchanger 20 and is finally discharged through pipe 33 to a finished oil storage tank (not shown).

The stripping gas may be carbon dioxide, hydrogen, nitrogen or other non-oxidizing, inert gas, but it is preferably a light hydrocarbon mixture, such as natural gas, and it may be introduced into the system through pipe 34. The hydrocarbon gas from this source or from pipe 17 is selectively introduced at the base of calcium oxide tower 35, 36 or 37 by means of suitable pipes 38 and regulating valves 39. These towers are preferably packed with calcium oxide, (quick lime), and to prevent channeling the lumps of quick lime are spread on spaced screens 40. The quick lime accomplishes two functions: it removes any hydrochloric acid which may be in the gases and at the same time it removes any moisture which might get into the system, thereby keeping the gas in a very dry condition. It should be understood that I may use other materials for accomplishing the above functions,— for instance, I may scrub out hydrochloric acid with a high-boiling amine, such as triethanolamine, and if an aqueous absorber is used for the HCl I may subsequently dry the gases with calcium chloride.

The gases from the tops of the quick lime towers may be passed through pipes 41 to line 42, or they may be passed through pipes 43 to line 44. Line 42 leads the gases to a preheater 45, which may be of the conventional pipe still type, wherein the gases are heated to about 300–500° F. These gases are then passed by pipe 46 to the base of stripper tower 22 wherein they flow upwardly countercurrent to the descending stream of oil.

Stripper tower 22 is essentially a preheater and drying chamber for the oil. In the top of this tower the temperature will be only about 180–250° F. and at this temperature practically all of the water is removed from the oil so that substantially no hydrolysis of the ether will result from the action of water carried by the oil. The temperature in the bottom of this tower may be about 300° F., at which temperature it is introduced into the top of stripper 25 as hereinabove described.

The gases from line 44 are heated in pipe still 47 to about 400–700° F., at which temperature the gases are introduced through pipe 48 and distributors 49 into strippers 25, 28, and 31. The temperature at the bottom of tower 25 may be about 350°, at the bottom of 28 at 400°, and at the bottom of 31 at 450°. These temperatures are by way of example only and they may be varied through a considerable range.

The stripping gases, together with dichlorethyl ether, are conducted from the tops of strippers 25, 28 and 31 through pipes 51 and line 50 to condenser 13 wherein most of the dichlorethyl ether is liquefied. The resulting mixture is introduced by pipe 12 into the absorber 11, as hereinabove described.

The stripping gases from the top of tower 22 contain a considerable amount of moisture, and I therefore prefer to treat them separately. They may be passed through pipe 52 to cooler 53 for condensing the moisture, the water may be trapped out in separator 54 and discharged through pipe 55, and the gases may be introduced by pipe 56 and feed pipes 57 to the base of one of the quick lime towers, preferably after stripping the dichlorethyl ether from them (not shown). Dichlorethyl ether condensing in coil 53 may be drawn from separator 54 through pipe 54a.

In a similar manner I may employ my process for recovering the solvent from the naphthenic extract of mineral oil containing 50–75% of solvent.

It should be understood that I do not limit myself to the particular details hereinabove described. For example, I may use two or three stripping towers as driers, and only one or two for the subsequent stripping action. I may circulate two separate systems of gases,—one through the drying tanks and the other through the other stripping tanks. It should be noted that any of the quick lime towers may be selectively cut out of the system for cleaning and/or recharging. Also, I may employ the freshly charged towers for drying the gases employed in towers 25, 28 and 31, using the partially exhausted drying towers for the gas employed in stripper 22. Various modifications of my system will be apparent to those skilled in the art.

Although I have described the operation of this system in connection with the removal of dichlorethyl ether from mineral oils, it should be understood that the process may be employed with other halogenated solvents and chlorinated solvents generally. For example, I may use the process for removing carbon tetrachloride from vegetable oils and fats. I may employ it with mineral oils extracted with solvents, such as tetrachlor ethylene, ethylene dichloride, ethyl chloracetate, monochlor acetone, ethylene and propylene chlorhydrine, bromoform, and other related organic halogen derivatives. The process, however, is particularly adapted to the recovery of the higher boiling solvents which require high temperatures for their removal from oils.

I claim:

1. The method of recovering small amounts of dichlorethyl ether used in the extraction of mineral oils, which comprises stripping said oils with an inert medium whereby the solvent is removed from the oil and admixed with the stripping medium, and contacting said stripping medium and its contained solvent with incoming oil to be extracted whereby the incoming oil absorbs the solvent from the tripping medium for reuse.

2. The process of removing traces of dichlorethyl ether from hdyrocarbon oils which comprises drying light hydrocarbon gases, heating said dry gases to a temperature of about 300° F. to 700° F., passing said hot gases in contact with said oil whereby water is eliminated from the oil, and contacting said dry oil with further amounts of hot, inert light hydrocarbons whereby the last traces of the solvent are stripped from the oils.

3. The method of continuously stripping small amounts of dichlorethyl ether from mineral oils which comprises drying light hydrocarbon gases, heating said gases to a temperature of about 300° F. to 700° F., stripping the oil with a portion of said heated gases to remove water from said oil, separating the water from said gases and returning said gases to the drying step and stripping the oil at higher temperatures with the remaining portions of heated gases, removing solvent from the stripping gases, and returning said stripping gases to the drying step.

4. The method of claim 2 wherein the gases are neutralized as well dried before being used for stripping dichlorethyl ether from oil.

MAX G. PAULUS.